United States Patent [19]

Harrington et al.

[11] 3,865,844
[45] Feb. 11, 1975

[54] N-(THIENYLALKYL)-FLUOROALKANESULFONADMIES

[75] Inventors: Joseph Kenneth Harrington, Edina; Robert D. Trepka, Woodbury, both of Minn.

[73] Assignee: Minnesota Mining and Manufacturing Company, St. Paul, Minn.

[22] Filed: July 12, 1973

[21] Appl. No.: 378,622

Related U.S. Application Data

[60] Division of Ser. No. 150,789, June 7, 1971, Pat. No. 3,766,193, which is a continuation-in-part of Ser. No. 795,050, Jan. 29, 1969, Pat. No. 3,629,332.

[52] U.S. Cl. ............................................. 260/332.5
[51] Int. Cl. ............................................ C07d 63/12
[58] Field of Search ................................ 260/332.5

[56] References Cited
UNITED STATES PATENTS

| | | | |
|---|---|---|---|
| 3,629,332 | 12/1971 | Harrington et al. | 260/556 F |
| 3,766,193 | 10/1973 | Harrington et al. | 260/294.8 F |

*Primary Examiner*—Henry R. Jiles
*Assistant Examiner*—C. M. S. Jaisle
*Attorney, Agent, or Firm*—Alexander, Sell, Steldt & DeLaHunt

[57] ABSTRACT

N-(Aralkyl)fluoroalkanesulfonamides wherein the alkyl group is substituted by a heterocyclic radical and salts thereof and processes for their preparation are disclosed. These compounds and their compositions are plant growth modifiers, i.e., they modify and/or terminate the growth of plants.

4 Claims, No Drawings

N-(THIENYLALKYL)-FLUOROALKANESULFONAMIDES

This is a division of application Ser. No. 150,789, filed June 7, 1971, now U.S. Pat. No. 3,766,193 issued Oct. 16, 1973, which is a continuation-in-part of the copending application Ser. No. 795,050, filed Jan. 29, 1969 now U.S. Pat. No. 3629332, issued Dec. 21, 1971.

The present invention relates to substituted fluoroalkanesulfonamides and more particularly to N-(aralkyl)fluoroalkanesulfonamides in which the alkyl group bonded to the amide nitrogen is substituted by a heterocyclic radical selected from pyridyl, furyl, thienyl and benzimidazolyl. Salts of the fluoroalkanesulfonamides are also included.

The preparation and use of these compounds and their compositions as plant growth modifiers, i.e., as herbicides and plant growth regulators (other than herbicides) are also included. The compounds are particularly valuable as herbicides.

The present invention provides compounds of the formula:

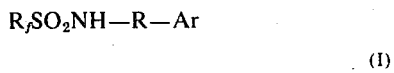

(I)

wherein $R_f$ is a fluoroalkyl group of one or two carbon atoms, R is an alkylene radical containing one or two carbon atoms and Ar is a heterocyclic selected from pyridyl, thienyl, furanyl and benzimidazolyl. Salts of these compounds are also included within the scope of the invention. The compounds in which a hydrogen atom is bonded to the amide nitrogen (such as in Formula (I)) can be considered to be the acid form.

Preferably, $R_f$ contains at least two fluorine atoms per carbon atom, and most preferably it is trifluoromethyl. When the ratio of fluorine atoms to carbon atoms in the $R_f$ group is less than 2:1 in the compounds of the invention, their herbicidal activity is generally of a lower level.

It is preferred that R be a methylene ($-CH_2-$) group, because such compounds generally have a higher degree of herbicidal effectiveness and are prepared from more readily available starting materials than are the compounds of the invention in which R contains more than one carbon atom.

Salts of the compounds of Formula I can be prepared by reacting the hydrogen bonded to the sulfonamido nitrogen with an appropriate base under mild conditions. The salts which can be formed include those of alkali metals, for example, lithium, sodium and potassium, alkaline earth metals such as magnesium, barium and calcium and other metals such as aluminum. The ammonium salts can be prepared similarly by treating the compounds of Formula I with ammonium hydroxide. The salts of organic amines such as alkylamines, morpholine, methyl cyclohexylamine or glucosamine can be obtained by reacting the acid with the appropriate organic base. Salts of heavy metals such as zinc and iron are also within the purview of the invention. The foregoing are horticulturally acceptable salts which are selected for the particular end use.

The acid form compounds of the invention are generally prepared from intermediate primary amines and fluoroalkanesulfonyl halides or fluoroalkanesulfonic anhydrides known in the chemical literature as follows:

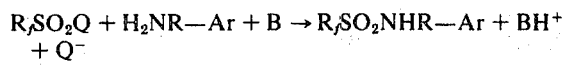

where Q is a halogen or a fluoroalkanesulfonate residue, B is an organic or inorganic base and $R_f$, R and Ar are as previously defined.

A solution of the appropriate primary amine and an equimolar quantity (at least) of a suitable acid acceptor (such as triethylamine) in an inert organic solvent is prepared. In some cases B may be $H_2NR-Ar$. Among the suitable solvents are glyme, benzene, dichloromethane and chloroform. An equimolar quantity of the appropriate fluoroalkanesulfonic anhydride or halide is added to the solution. The addition is advantageously carried out at $-15°$ to $50°$ C., but this may be raised or lowered if desired. Usually the reaction is complete within a few minutes following addition.

In cases where the amine is of lower reactivity, it is advantageous to allow the reaction mixture to remain at reflux temperature for a few hours following addition. Alternatively, the reaction may be carried out by heating in a pressure reactor at temperatures of $50°$ to $150°$ C.

After completion of the reaction, the product is isolated by conventional methods. For example, the reaction mixture can be extracted with excess aqueous sodium hydroxide. The aqueous extract is then washed with organic solvents and treated with charcoal to remove impurities. Subsequent acidification of the aqueous extract with mineral acid then affords the product as an oil or solid which is distilled, sublimed, chromatographed or recrystallized as required to give pure product. When water-soluble solvents are used, the reaction mixture can be poured directly into aqueous mineral acids. The product is then isolated by conventional extraction techniques and purified as above.

Suitable fluoroalkanesulfonyl anhydrides and halides (e.g. fluorides and chlorides) for use in this method are known to the art (see U.S. Pat. No. 2,732,398) or may readily be prepared by methods known to the art. Similarly, the amines used in producing the compounds of this invention are described in the general chemical literature or are otherwise known to those skilled in the art, or may readily be prepared by methods known to the art.

The compounds of this invention may be herbicides, that is, agents useful for killing (terminating the growth of) higher plants, and/or may regulate the growth of plants in other ways. The general term plant growth modification is used herein to encompass herbicidal and other plant growth regulating effects which are included within the activity of the compounds of this invention. Such regulating effects include all deviations from natural development, for example, defoliation, stimulation, stunting, retardation, desiccation, tillering, dwarfing, and the like.

In order to control unwanted plants, the compounds of the invention can be used alone, for example, as dusts or granules of the compounds, or preferably then may be applied in formulations. The formulations are comprised of active ingredients and one or more plant growth modifying adjuvants and/or carriers. Generally, an inert horticultural diluent is used together with the active ingredient and frequently also a surface active agent is included. Formulations are useful to facilitate the application of the compounds and to achieve specific biological objectives such as controlling the availability of the plant growth modifier, improving adherence to plants, and the like, as is well known to those skilled in the art.

The compounds of the invention may be formulated as wettable powders, emulsifiable concentrates, aqueous or nonaqueous solutions and/or suspensions, granules, dusts and the like. Said compounds can be finely divided and suspended in any of the usual aqueous media, or if appropriate salts are used, a solution may be chosen. Spreading agents, wetting agents, sticking agents or other adjuvants can be added as desired.

When emulsifiable concentrates are prepared the active ingredient can be in a concentration of about 5% to 60% or more, depending upon its solubility. The units of concentration are weight per unit weight. When the active ingredients are not the salts of the invention they are soluble in common organic horticultural solvents such as benzene, toluene, xylene, dichloromethane, chloroform, hexane and heptane or less highly refined aromatic or aliphatic hydrocarbons and mixtures thereof. Examples of these are coal tar fractions, straight run petroleum distillates, thermolytically or catalytically cracked hydrocarbon oil, gas oil, light or lubricating oil fractions, kerosene, mineral seal oil, and the like. In appropriate cases oxygenated solvents such as ketones may be used in or as the carriers. These concentrates can be dispersed in water to permit the use of an aqueous spray. A mixture with a small amount of an organic surface active agent capable of lowering the surface tension of water is preferred.

Examples of surface active agents variously known as dispersing agents, wetting agents, or emulsifying agents comprise soft or hard soaps, morpholine or dimethylamine oleate, sulfonated fish, castor and petroleum oils, sodium salts of lignin sulfonic acid, alkylated aromatic sodium sulfonates, such as decylbenzene sodium sulfonate, dodecylbenzene sodium sulfonate, butyl or other amine salts of decyl or dodecylbenzene sulfonic acid, sodium lauryl sulfate, disodium monolauryl phosphate, ethylene oxide condensation products of alkyl phenols, as, for example, octyl phenol, ethylene oxide condensation products of tall oil, and ethylene oxide condensation products of higher alcohols or higher mercaptans. Mixtures of two or more surface active agents are also feasible. Generally, the surface active agent will comprise only a small proportion of the composition, say 0.1–15% by weight of the toxicant.

The formulation of dry compositions for application as granules, dusts or for further dilution with liquid carriers is readily accomplished by mixing the toxicant with a solid carrier. Such solid carriers will be of various sizes from dust to granules. The techniques for such formulations are well known to the art. Suitable carriers include charcoal, talc, clay, pyrophyllite, silicas, fuller's earth, lime, diatomaceous earth, flours such as walnut shell, wheat, soya bean, cottonseed and wood flours, magnesium and calcium carbonate, calcium phosphate and the like. Powders may be granulated by the use of suitable binders such as cellulose derivatives, for example, ethyl or carboxymethyl, corn syrup, and the like. The compounds or the above formulations are applied by spraying, spreading, dusting or the like. The rate of application will of course vary, but the more active compounds of the invention exhibit satisfactory control of broadleaf and grass weeds at the application rate of about 5 to 40 lbs. per acre. It is of course to be expected that local conditions, for example, temperature, humidity, moisture content of the soil, nature of the soil, and the like, may require greater or smaller amounts. Effective resolution of these factors is within the skill of those versed in the herbicidal art. Likewise it is apparent that not all of the compounds included within the scope of the invention have equal activity.

The herbicidal compositions may contain one or more of the herbicidal compounds set out hereinbefore as the sole active species, or they may contain in addition thereto other biologically active substances. Thus insecticides and fungicides may be incorporated in the compositions. Further, if desired, the herbicidal compositions may contain fertilizers, trace metals or the like and when applied directly to the soil may additionally contain nematicides, soil conditioners, and other plant growth regulators and/or herbicides of similar or different properties.

The compounds of the invention are organic acids, and as such have useful activity as polymerization catalysts, for example, for epoxide monomers.

In order to further illustrate the invention, the following non-limiting examples are provided. Melting points are uncorrected.

EXAMPLE 1

A mixture of 3-pyridylmethylamine (16.2 g., 0.15 mole), trifluoromethanesulfonyl fluoride (22.8 g., 0.15 mole) and triethylamine (16 ml.) is heated for 12 hours at 70° C. in a pressure reactor. A dark liquid is recovered from the pressure reactor. This liquid is evaporated under vacuum, then 10% sodium hydroxide solution is added and the mixture is steam distilled to remove the triethylamine. The aqueous solution is cooled and treated with charcoal, then filtered. The filtrate is acidified to pH 5–6. This solution is extracted thoroughly with a large volume of dichloromethane. The dichloromethane solution is dried over magnesium sulfate, then evaporated under vacuum to obtain a solid residue. The residue is recrystallized from a benzene-hexane mixture twice, then sublimed to provide a white solid. The product is N-(3-picolyl)trifluoromethanesulfonamide, m.p. 122.5°–124.5° C.

| Analysis: | %C | %H | %N |
|---|---|---|---|
| Calculated for $C_7H_7F_3N_2O_2S$: | 35.0 | 2.9 | 11.7 |
| Found: | 35.1 | 2.9 | 11.8 |

Using the procedure of Example 1 the compounds N-(2-picolyl)trifluoromethanesulfonamide, m.p. 101°–103° C., and N-(4-picolyl)trifluoromethanesulfonamide m.p. 168°–168.5° C. are prepared.

EXAMPLE 2

Furfurylamine (20 g., 0.21 mole) dissolved in chloroform (300 ml.) and triethylamine (21 g.) is treated dropwise with trifluoromethanesulfonic anhydride (5.8 g., 0.21 mole) while maintaining the temperature between 30° and 35° C. under a nitrogen atmosphere. The mixture is stirred for 2 hours at room temperature, then it is poured into 1 liter of ice water. The mixture is shaken, then separates into two layers. The chloroform layer is dried over magnesium sulfate, then evaporated under vacuum to dryness. The residue is stirred overnight with 10% sodium hydroxide solution (700 ml.). This solution is then extracted twice with three 50 ml. portions of chloroform. The remaining aqueous layer is treated with concentrated hydrochloric acid until the solution reaches pH 2. A dark oil is separated from the aqueous layer, dissolved in a small amount of chloroform and purified by chromatography on a silica gel column. Elution is carried out with chloroform, and the main fraction of yellow oil solidifies on cooling. The product is N-trifluoromethanesulfonyl-2-aminomethylfuran, m.p. 8°–10° C.

| Analysis: | %C | %H |
|---|---|---|
| Calculated for $C_6H_6F_3NO_3S$: | 31.4 | 2.64 |
| Found: | 31.1 | 2.7 |

EXAMPLE 3

A chloroform (200 ml.) solution of thenylamine (15 g., 0.13 mole) and triethylamine (13.4 g., 0.133 mole) is treated dropwise with trifluormethanesulfonic anhydride (37.4 g., 0.133 mole) while maintaining the temperature at 27°–34° C. over 1 hour. Stirring is continued for an additonal 2 hours at room temperature. Water (50 ml.) is slowly added to the reaction mixture, then the mixture is poured into 1 liter of ice water. The mixture is shaken vigorously and the organic layer is separated. The organic layer is dried over anhydrous magnesium sulfate, filtered, then evaporated under vacuum. The residue is a brown oil. The oil is stirred overnight at room temperature in 10% sodium hydroxide solution (500 ml.). The aqueous solution is then washed and extracted with chloroform, first with a 200 ml. portion then with two 50 ml. portions. The aqueous layer is then filtered and acidified to pH 1–2, providing a white solvent. The product, N-trifluoromethanesulfonylthenylamine, is recrystallized from petroleum ether to give white crystals, m.p. 50°–51° C.

| Analysis: | %C | %H | %F |
|---|---|---|---|
| Calculated for $C_6H_6F_3NO_2S_2$: | 29.39 | 2.46 | 23.25 |
| Found: | 29.5 | 2.5 | 23.2 |

EXAMPLE 4

A solution of dichloromethane (100 ml.), triethylamine (7.95 g., 0.079 mole) and 2-(2-pyridyl)ethylamine (9.53 g., 0.0787 mole) is treated with excess trifluoromethanesulfonyl fluoride, and the mixture is heated to its reflux temperature and maintained at reflux temperature for 2 hours. The solution is then allowed to sit overnight at room temperature. The solvent and volatile components are partially removed by evaporation under vacuum, then diethyl ether and water are added to the residue. The residue is acidified with 6N HCl, and the ether layer becomes clear and separates. The aqueous layer is treated with 10% sodium hydroxide solution. A precipitate forms and the aqueous solution is extracted twice with diethyl ether, the ether layer is washed with water and a saturated sodium chloride solution, then dried over anhydrous sodium sulfate. After filtration the ether extracts are evaporated under vacuum to obtain a solid residue of product. The product is recrystallized from carbon tetrachloride to give N-[2-(2-pyridyl)ethyl]trifluoromethanesulfonamide. The product is sublimed at 86° C./0.05 mmHg to white solid with m.p. 84°–88° C.

| Analysis: | %C | %H | %N |
|---|---|---|---|
| Calculated for $C_8H_9F_3N_2O_2S$: | 37.8 | 3.6 | 11.0 |
| Found: | 38.2 | 3.5 | 10.8 |

EXAMPLE 5

A benzene (90 ml.) solution of triethylamine (6.96 g., 0.069 mole) and 2-(2-pyridyl)ethylamine (8.42 g., 0.69 mole) is treated with monofluoromethanesulfonyl chloride (9.14 g., 0.069 mole) dropwise with vigorous stirring. The temperature of the reaction mixture is maintained below 35° C. by the use of an ice-water bath. The mixture is stirred at room temperature for three hours. Water is added and the mixture is stirred, then filtered. The residue is washed with benzene and water, then dried. The product is recrystallized from benzene, then sublimed at 80° C./0.25 mmHg. The yellow product, N-[2-(2-pyridyl)ethyl]fluoromethanesulfonamide, has a melting point of 89.5°–91.5° C.

| Analysis: | %C | %H | %N |
|---|---|---|---|
| Calculated for $C_8H_{11}FN_2O_2S$: | 44.2 | 5.1 | 12.8 |
| Found: | 44.0 | 5.1 | 12.6 |

EXAMPLE 6

A mixture of 2-benzimidazolylmethylamine, triethylamine and trifluoromethanesulfonyl fluoride is heated in a pressure reactor for about 24 hours. A dark liquid is recovered from the pressure reactor, and the product, N-(2-benzimidazolyl)-trifluoromethanesulfonamide, is isolated according to the procedure of Example 1.

The herbicidal activity of a number of compounds of the invention has been established using the following procedures. Both pre- and post-emergence activity are determined in a direct screen against selected weed species. For the pre-emergence test, the following weed mixtures are planted in four rows in 6-inch plastic pots.

Grasses
Giant Foxtail (*Setaria faberii*)
Barnyard grass (*Echinochloa crusgalli*)
Crabgrass (*Digitaria isohaemum*)
Quackgrass (*Agropyron repens*)
Broadleaves
Pigweed (*Amaranthus retroflexus*)
Purslane (*Portulaca oleracea*)
Wild Mustard (*Brassica kaber*)
Wild Morning Glory (*Convolvulus arvensis*)

Two species are planted per row to allow for easier identification of the grass species as they emerge. 250 mg. of the test chemical is dissolved in acetone or another suitable solvent and then diluted with 125 ml. water to give a concentration of 2,000 ppm. or 62.5 ml. of water to give 4,000 ppm. From the 2,000 ppm. concentration, 60 ml. is diluted to 240 ml. to give a final concentration of 500 ppm. Eighty ml. of this solution is added to a 6 inch pot to give a concentration equivalent to 20 lbs./acre or 160 ml. is added to give 40 lb./acre. All subsequent waterings are made from the bottom. Two pots are used per treatment. Data are taken two to three weeks after treatment and recorded as percent kill for each species compared to the untreated controls.

In order to assess post-emergence activity, the same weed mixture as described above is used. The mixture is planted in 5 × 5 inch boxes and allowed to grow from 2 to 3 weeks depending on the time of the year. The plants are treated when the grasses are approximately 1 to 3 inches and the broadleaves 1-½ inches tall. Duplicate boxes are sprayed one at a time with a concentrate sprayer (DeVilbis') for approximately 10 seconds or until good wetting of the leaf surfaces occurs. The chemicals are prepared as described above but utilizing only the 2,000 ppm. concentrations. Data are taken two to three weeks after treatment and recorded as percent kill for each species compared to the untreated controls.

The compounds of Example 1 through 5 all show activity at 40 lb./acre or 4,000 ppm., although not all of the compounds are equally active.

What is claimed is:

1. A compound of the formula $$R_fSO_2NH-R-Ar$$

wherein $R_f$ is a fluoroalkyl group of one or two carbon atoms, R is an alkylene radical containing one or two carbon atoms and Ar is thienyl, or a horticulturally acceptable salt thereof.

2. A compound according to claim 1 wherein $R_f$ is $CF_3$.

3. A compound according to claim 1 wherein R is $-CH_2-$.

4. N-trifluoromethanesulfonylthenylamine according to claim 2.

* * * * *